June 2, 1925.

F. STOURAL

ANTISKID DEVICE

Filed Dec. 12, 1924

1,540,576

Inventor
F. Stoural

Bryant & Lowry
Attorneys

Patented June 2, 1925.

1,540,576

UNITED STATES PATENT OFFICE.

FRANK STOURAL, OF VERDIGRE, NEBRASKA.

ANTISKID DEVICE.

Application filed December 12, 1924. Serial No. 755,502.

*To all whom it may concern:*

Be it known that I, FRANK STOURAL, a citizen of the United States, residing at Verdigre, in the county of Knox and State of Nebraska, have invented certain new and useful Improvements in Antiskid Devices, of which the following is a specification.

This invention relates to certain new and useful improvements in anti-skid devices of the type associated with vehicle wheels, and more particularly the tread surfaces of pneumatic tires and has for its primary object to provide an adjustable clamping device for the anti-skid with the latter arranged in spaced relations around a tire and wheel rim.

A further object of the invention is to provide an anti-skid device wherein the means for anchoring the same upon a wheel embodies a screw adjustment to accommodate the device to tires and wheels of different diameters.

With the above and other objects in view that will become apparent as the nature of the invention is better understood, the same consists of the novel form, combination and arrangement of parts hereinafter more fully described, shown in the accompanying drawing and claimed.

Figure 1:
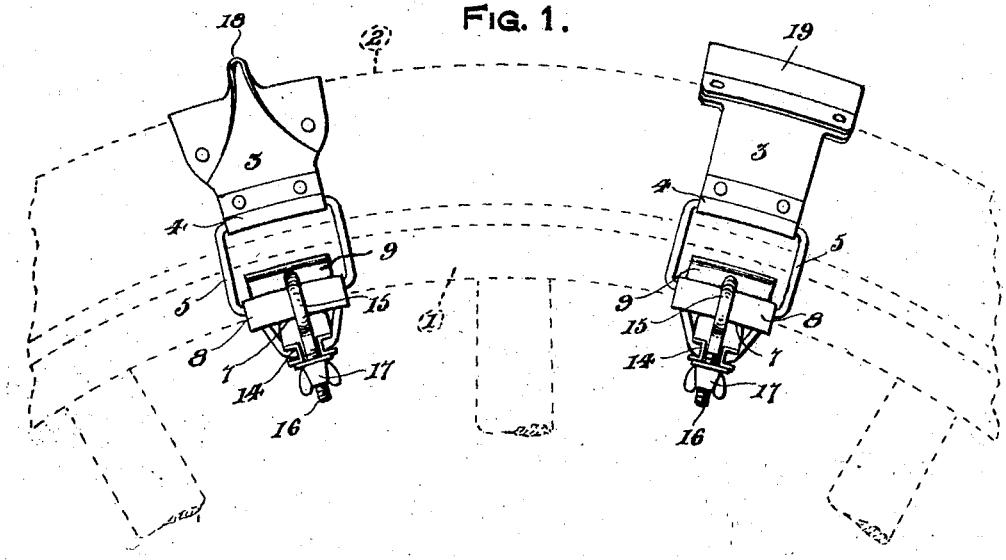
Figure 2:
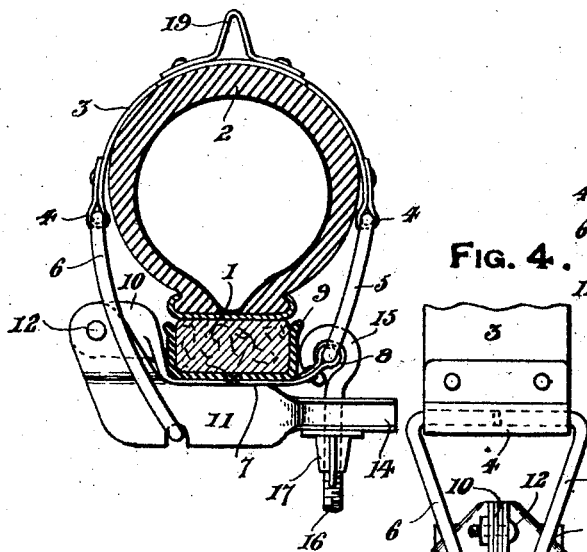
Figure 3:
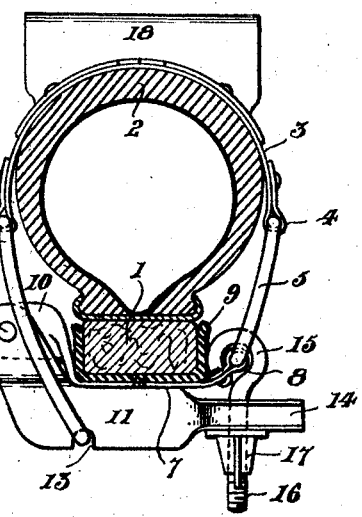
Figure 4:
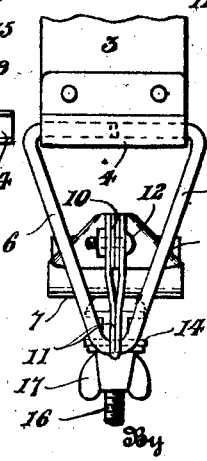

In the drawing, wherein like reference characters designate corresponding parts throughout the several views, Figure 1 shows by dotted lines, a fragmentary side elevational view of an automobile wheel with the anti-skid device of this invention in position thereon, Figure 2 is a front sectional view showing the anti-skid device in position upon the tire and wheel rim and the clamping devices in locked position with the anti-skid foot extending circumferentially of the tire, Figure 3 is a cross-sectional view similar to Fig. 2 showing the anti-skid foot extending across the tread of the tire, and Figure 4 is a fragmentary edge elevational view of the anti-skid device.

The anti-skid device is associated with a wheel embodying a felly 1 and tire 2 mounted thereon and includes a metallic tread plate 3 of curved formation that encloses the tread surface of the tire 2 as shown in Figs. 2 and 3, the opposite ends of the tread plate being bent upon themselves and suitably secured to form eye loops 4. A rectangular link 5 has one side thereof pivotally supported in one of the loops 4 and is of a length to have the opposite side thereof terminate adjacent the wheel felly 1. Another link 6 of substantially triangular formation as shown in Fig. 4 has one side thereof pivotally supported in the other loop 4 with the inner end thereof terminating inwardly of the felly 1 as shown in Figs. 2 and 3.

A wheel rim engaging plate 7 is pivotally connected at 8 to the inner side bar of the link 5 and is adapted to be positioned inwardly of the felly 1 as illustrated, a fabric or leather spacing member 9 being carried by the outer face of the plate 7 for directly engaging the felly and to prevent injury thereto. The opposite side of the plate 7 is bent outwardly and is bent upon itself transversely of the plate 7 to form an ear 10.

A clamping arm 11 of angle formation as shown in Figs. 2 and 3 is pivotally mounted upon the pin 12 carried by the ear 10. The clamping arm 11 is adapted to be positioned beneath or inwardly of the felly engaging plate 7 when in its clamped position with the outer edge of the clamping arm contacting the adjacent face of the plate 7. The inner edge of the clamping arm 11 is provided with an edge opening notch 13 that receives the adjacent end of the link 6. When the tread plate 3 is placed upon the tire 2, the arm 11 is swung laterally upon its pivotal mounting 12 and the plate 7 and strip 9 are positioned for enclosing relations with the inner face of the felly 1. The inner end of the link 6 is then placed in the notch 13 of the clamping arm and the latter is then moved upon its pivotal connection 12 to draw the anti-skid device into intermittent engagement with the tire, moving the inner end of the link 6 in a direction toward the radial axis of the felly and binding the anti-skid device in position upon the tire and felly.

The free end of the clamping arm 11 embodies a pair of spaced legs 14 between which an adjusting screw and nut extend for locking the clamping arm in position, an eye bolt or scroll 15 having the eye end thereof inclosing the inner bar of the rectangular link 5 and freely passing through an opening in the adjacent end of the plate 7 with the lower threaded end 16 thereof projecting between the legs 14. A thumb nut 17 threaded on the eye bolt or screw 15 is moved into engagement with the adjacent sides of the legs 14 to retain the eye bolt against movement and to hold the clamping arm 11 in its locked position with the antiskid device secured upon the tire and wheel felly. It being understood that the antiskid devices are arranged in spaced relation upon the tire as illustrated in Fig. 1, the adjacent ground engaging spurs or feet extend in opposite directions, the foot 18 as shown in Fig. 3 extending transversely of the tire 2 while the foot 19 extends circumferentially of the tire at the center of the tread portion thereof.

From the above detail description of the device, it is believed that the construction and operation thereof will at once be apparent, it being noted that when the device is applied to the tire, the thumb nut 17 is loosened to permit disengagement of the clamping arm 11 from the eye bolt 15 so that the clamping arm may be swung laterally to disengage the link 6 therefrom. When the device is positioned in inclosing relations with a tire, the arm 11 is swung outwardly to receive the adjacent end of the link 6 in the edge notch 13 thereof and pivotal movement of the free end of the clamping arm in a direction toward the eye bolt will move the several parts of the device into intimate engagement with the tire and wheel felly and position the spaced legs 14 of the clamping arm for reception of the eye bolt 15 therebetween. With the clamping nuts 17 adjusted for contacting the adjacent sides of the legs 14, the anti-skid device is securely locked upon the wheel and accidental displacement thereof is eliminated.

While there is herein shown and described the preferred embodiment of the present invention it is nevertheless to be understood that minor changes may be made therein without departing from the spirit and scope of the invention as claimed.

What is claimed as new is:—

1. In an anti-skid device, an arcuate tire engaging plate, a link carried by each side thereof, a felly engaging plate to which one of the links is pivotally attached at one side, a clamping arm pivotally attached to the other side of the felly plate and constructed for detachable engagement with the other link, a threaded bolt carried by the link adjacent the felly plate mounting, spaced legs at the free end of the arm between which the bolt is positioned and a nut threaded on the bolt into engagement with the legs for holding the clamping arm in closed position.

2. In an anti-skid device, an arcuate tire engaging plate, a link carried by each side thereof, a felly engaging plate to which one of the links is pivotally attached at one side, a clamping arm pivotally attached to the other side of the felly plate, the lower edge of the arm having a notch therein to detachably receive the other link, a threaded bolt carried by the link adjacent the felly plate mounting, spaced legs at the free end of the arm between which the bolt is positioned and a nut threaded on the bolt into engagement with the legs for holding the clamping arm in closed position.

In testimony whereof I affix my signature.

FRANK STOURAL.